United States Patent [19]
Inoguchi et al.

[11] Patent Number: 6,120,159
[45] Date of Patent: Sep. 19, 2000

[54] COMBINED DISPLAY PANEL

[75] Inventors: Kazuhiro Inoguchi, Toyota; Yasuaki Hirokawa, Nagoya; Takashi Hagiwara; Nobuei Ito, both of Chiryu; Tadashi Hattori, Okazaki, all of Japan

[73] Assignee: Denso Corporation, Kariya, Japan

[21] Appl. No.: 08/899,566

[22] Filed: Jul. 24, 1997

[30] Foreign Application Priority Data

Jul. 26, 1996 [JP] Japan ...................... 8-198021
May 23, 1997 [JP] Japan ...................... 9-134020

[51] Int. Cl.$^7$ ...................................... G01D 11/28
[52] U.S. Cl. .......................... 362/29; 362/84; 362/489
[58] Field of Search ........................ 362/23, 29, 84, 362/489

[56] References Cited

FOREIGN PATENT DOCUMENTS

| | | |
|---|---|---|
| 0 775 291 | 5/1997 | European Pat. Off. . |
| 55-16746 | 4/1980 | Japan . |
| 55-39284 | 9/1980 | Japan . |
| 60-191079 | 12/1985 | Japan . |
| 61-11186 | 1/1986 | Japan . |
| 3-17437 | 4/1991 | Japan . |
| 7-271310 | 10/1995 | Japan . |
| 9-207625 | 8/1997 | Japan . |
| 2266375 | 10/1993 | United Kingdom .................... 362/489 |

*Primary Examiner*—Stephen Husar
*Attorney, Agent, or Firm*—Pillsbury Madison & Sutro LLP.

[57] ABSTRACT

A transparent display panel such as an electroluminescent panel is overlapped on a part of a conventional instrument panel for use in an automobile. The overlapped display panel displays additional information such as navigation maps when required and is turned off under a normal driving condition. When the overlapped transparent display panel is turned off, the conventional instrument panel displays information such as a vehicle speed, an engine speed so and so forth. In this situation, overall luminance on the combined display panel is made uniform throughout a whole surface including the area where the transparent display panel is overlapped. To realize the uniformity of luminance, brightness of back lamps for illuminating the instrument panel is adjusted or a filter having an adequate transparency is used. The combined display panel may be also made by combining a non-transparent display panel with a conventional instrument panel. A filter may be used in this case to attain an overall uniform luminance on the combined display panel.

12 Claims, 16 Drawing Sheets

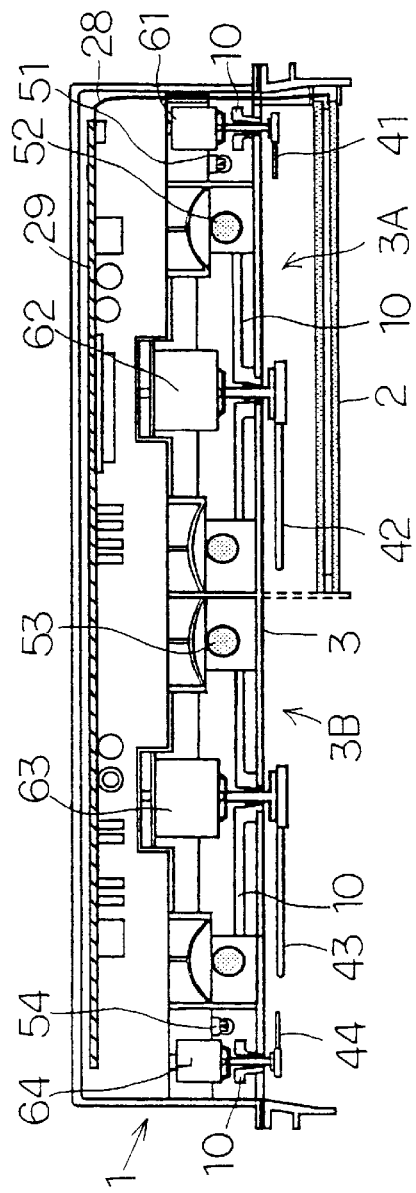
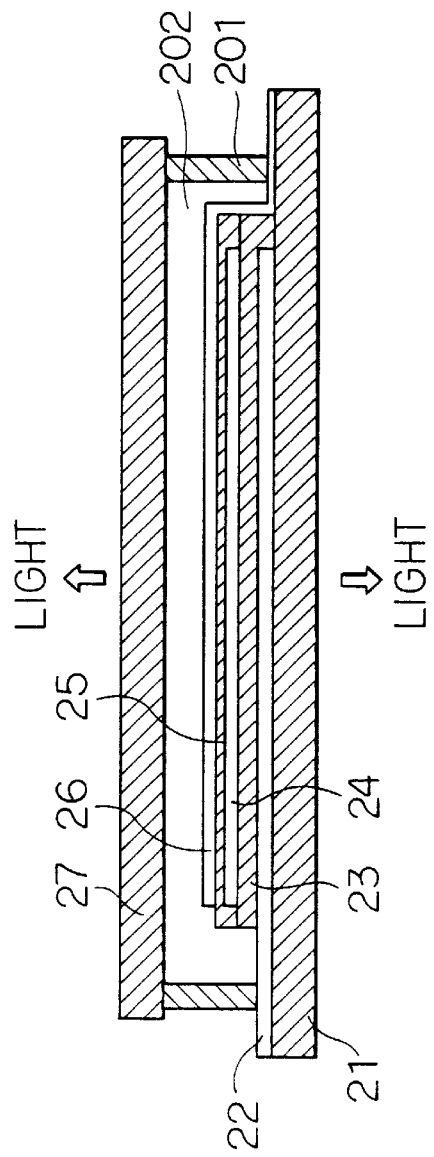

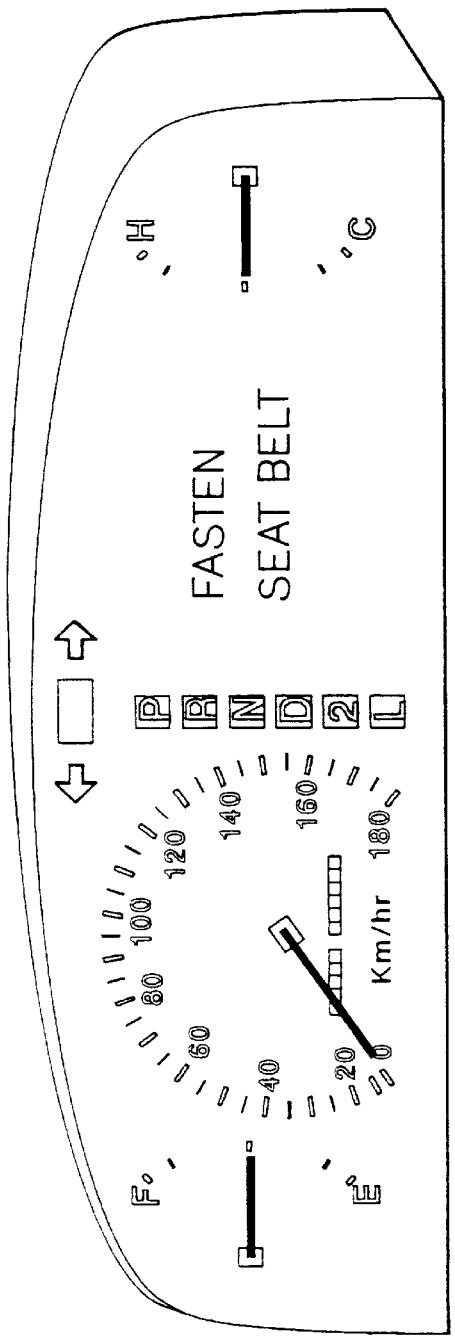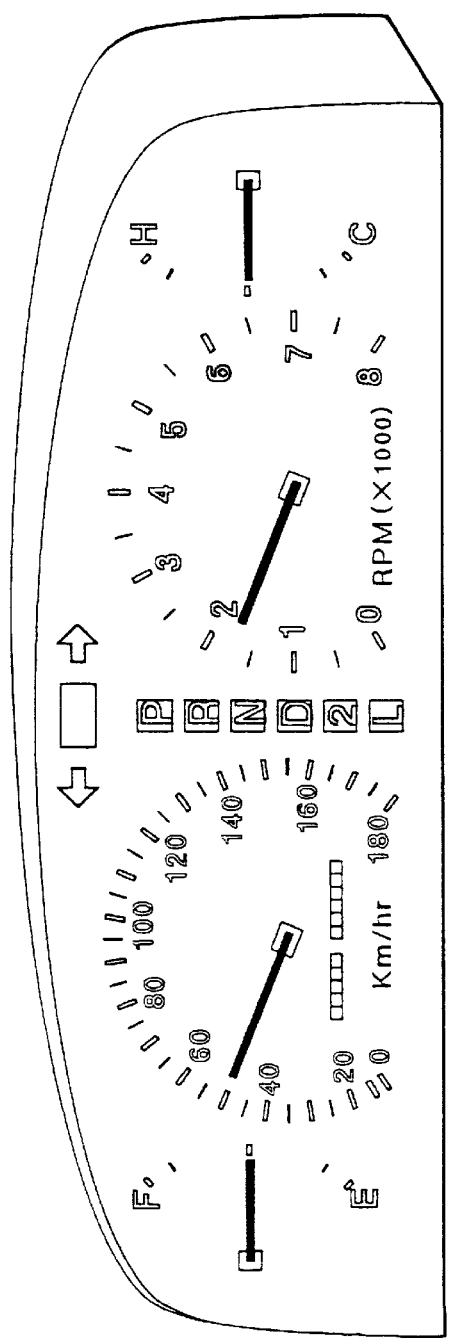

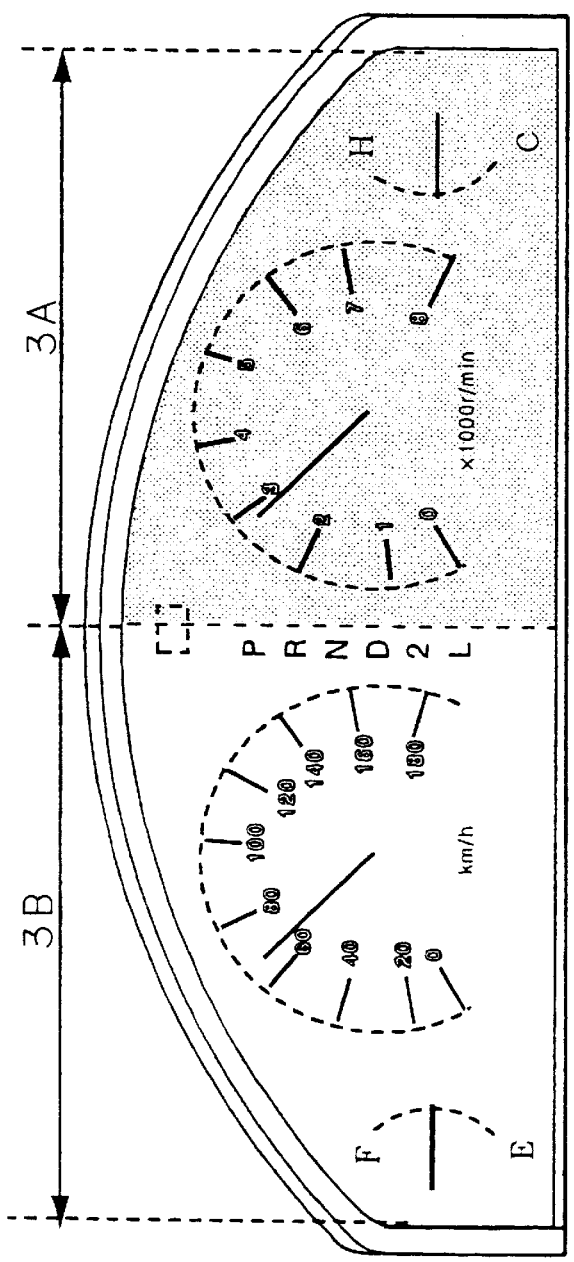
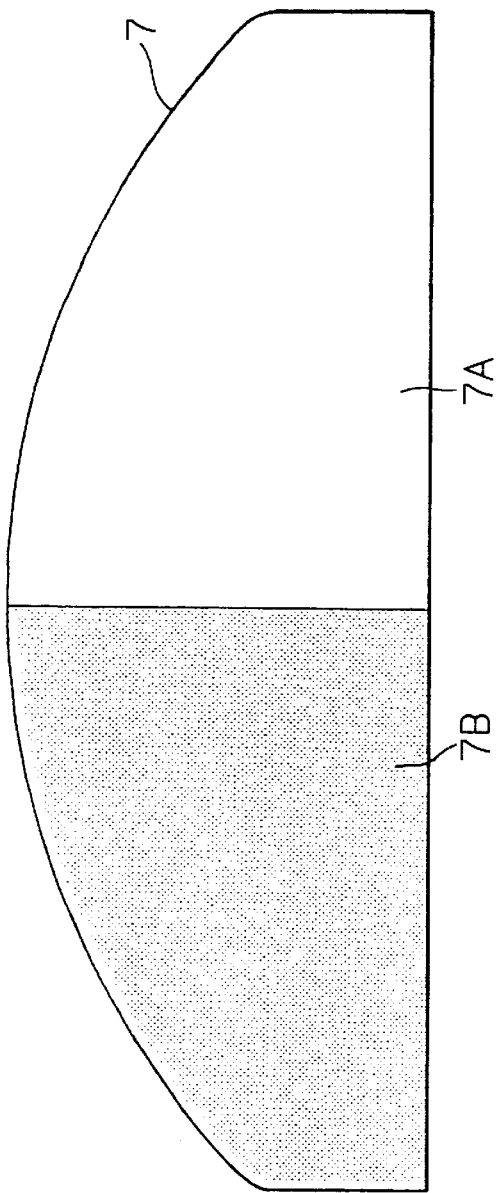
FIG.17A
FIG.17B

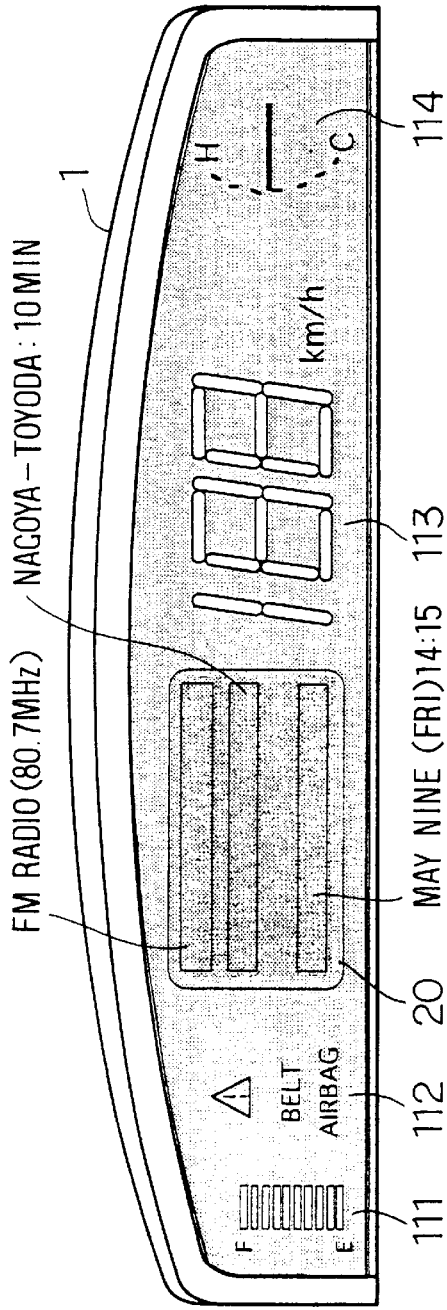
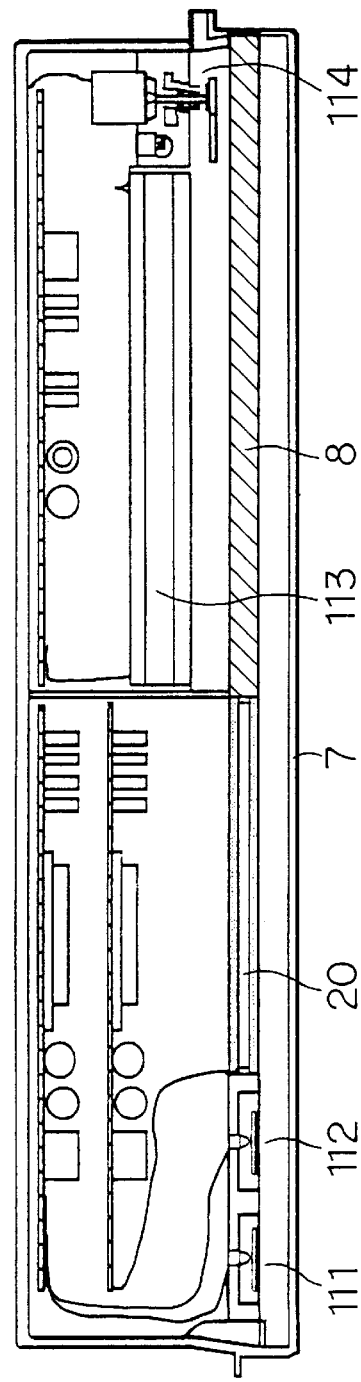

COMBINED DISPLAY PANEL

CROSS-REFERENCE TO RELATED APPLICATIONS

This application is based upon and claims benefit of priority of Japanese Patent Applications No. Hei-8-198021 filed on Jul. 26, 1996 and No. Hei-9-134020 filed on May 23, 1997, the contents of which are incorporated herein by reference.

BACKGROUND OF THE INVENTION

1. Field of the Invention

The present invention relates to a combined display panel for displaying various information thereon, and more particularly to a combined display panel in which a transparent display panel is disposed in front of a part of a surface of an instrument panel for use in an automotive vehicle, for example.

2. Description of Related Art

Combined display panels in which a transparent display panel such as a liquid crystal or electroluminescent display panel is disposed on the front surface of a usual instrument panel have been proposed hitherto. For example, Japanese Utility Model Publications No. Sho-55-16746 and No. Hei-3-17437 disclose a combined display panel having a transparent display panel of a liquid crystal or an electroluminescent panel disposed in front of a conventional instrument. Display devices of this kind are able to display images displayed on the transparent panel in addition to images displayed on the conventional panel.

Japanese Patent Laid-Open Publication No. Hei-7-271310 discloses a combined display device of the same kind. This device turns off the display on a back panel when a front panel display is activated, and vice versa. In other words, images on the back and the front panels are selectively displayed. However, in an instrument panel of an automotive vehicle which displays various information on the same panel, including information such as vehicle speeds which have to be displayed always and information such as engine rotational speeds which are not necessary to be displayed always, it is not possible to turn off all the images displayed on the back or front panel. It is possible to overlap the front panel only on a part of the surface of the back panel where information which is not required to be displayed always is displayed, and to activate selectively the back and front panels. For example, a transparent front panel may be overlapped only on the surface of the back panel where a tachometer (engine speed indicator) is located and the surface of the back panel where a speedometer is located is left open without overlapping the front panel, and both images on the back and front panels may be selectively switched on or off.

In this case, however, there is a problem that luminance or brightness of the display device between the overlapped portion and the non-overlapped portion becomes different, because the transparent panel is not perfectly transparent but its transparency is usually less than 80%. This is because the transparent panel such as a liquid crystal or an electroluminescent panel is composed of many layers which are not perfectly transparent. The imbalance of luminance is harmful to a quality display.

SUMMARY OF THE INVENTION

The present invention has been made in view of the above-mentioned problem, and an object of the present invention is to provide a combined display panel in which a front panel is overlapped only on a part of a back panel and luminance difference between the overlapped and non-overlapped portions is eliminated, and more particularly to provide a combined display panel having high display quality for an instrument panel of an automotive vehicle.

A transparent display panel such as an electroluminescent (EL) display panel is overlapped on a usual instrument panel to cover only a part thereof where information which is not required to be displayed always, such as a tachometer, is displayed. Displays shown on the EL panel and the overlapped portion of the instrument panel are selectively switched on or off. Under a normal and frequently occurring situation, only the instrument panel, i.e., the back panel is lit. In this case, there would be a luminance imbalance on the combined display panel between the overlapped and non-overlapped portions if the luminance of the instrument panel were uniform, because the transparency of the EL panel is not 100%. To eliminate the luminance imbalance on the combined display panel throughout a whole surface thereof, brightness of illuminating lamps for the back panel is made unequal between the overlapped and non-overlapped portions according to the present invention. That is, the brightness of the back lamps is made higher in the overlapped portion. The brightness of the back lamps may be adjusted without changing a brightness ratio between the overlapped and non-overlapped portions to attain an adequate luminance in accordance with an outside light while keeping a uniform overall luminance on the combined display panel.

Instead of making the back lamp brightness unequal, the overall luminance of the combined display panel may be made uniform by adding a filter for adjusting the luminance in front of the displays. A dimming filter which has different transparencies between the overlapped and non-overlapped portions may be placed to cover a whole front surface of the combined display panel. Also, a transparency adjustment filter may be placed to cover only the non-overlapped portion to attain an overall uniform luminance on the combined display panel.

The combined display panel may be also made by disposing an additional display panel on a part of a conventional instrument panel. In this case, to attain an overall uniform luminance on the combined display panel, a dimming filter covering a whole surface thereof, which has different transparencies in the area where the additional display panel is disposed and in the other area, may be used.

It is also possible to construct a combined display panel by placing two separate display surfaces so as not to overlap each other. When the two surfaces have different luminance, a transparency adjustment filter may be used to cover a brighter surface so that an overall luminance on the combined display panel is realized.

According to the present invention, luminance imbalance on the combined display panel is eliminated in various forms of the combined display panels, and a quality display can be realized.

Other objects and features of the present invention will become more readily apparent from a better understanding of the preferred embodiments described below with reference to the following drawings.

BRIEF DESCRIPTION OF THE DRAWINGS

FIG. 2 is a cross-sectional view of the combined display panel viewed from the top of FIG. 1;

FIG. 9 is a cross-sectional view showing a transparent electroluminescent panel used in the combined display panel shown in FIG. 1;

FIG. 10A is a front view of the combined display panel showing images shown on the panel during an idling period;

FIG. 10B is a front view of the combined display panel showing images shown on the panel under a normal driving condition;

FIG. 17A is a front view of the combined display panel showing a luminance imbalance between two sections when a dimming filter is removed;

FIG. 17B shows a dimming filter used on the panel of the second embodiment according to the present invention;

FIG. 22 is a front view of a combined display panel showing a fifth embodiment according to the present invention; and FIG. 23 is a cross-sectional view of the fifth embodiment viewed from the top of FIG. 22.

DETAILED DESCRIPTION OF THE PREFERRED EMBODIMENTS

Figure 1:
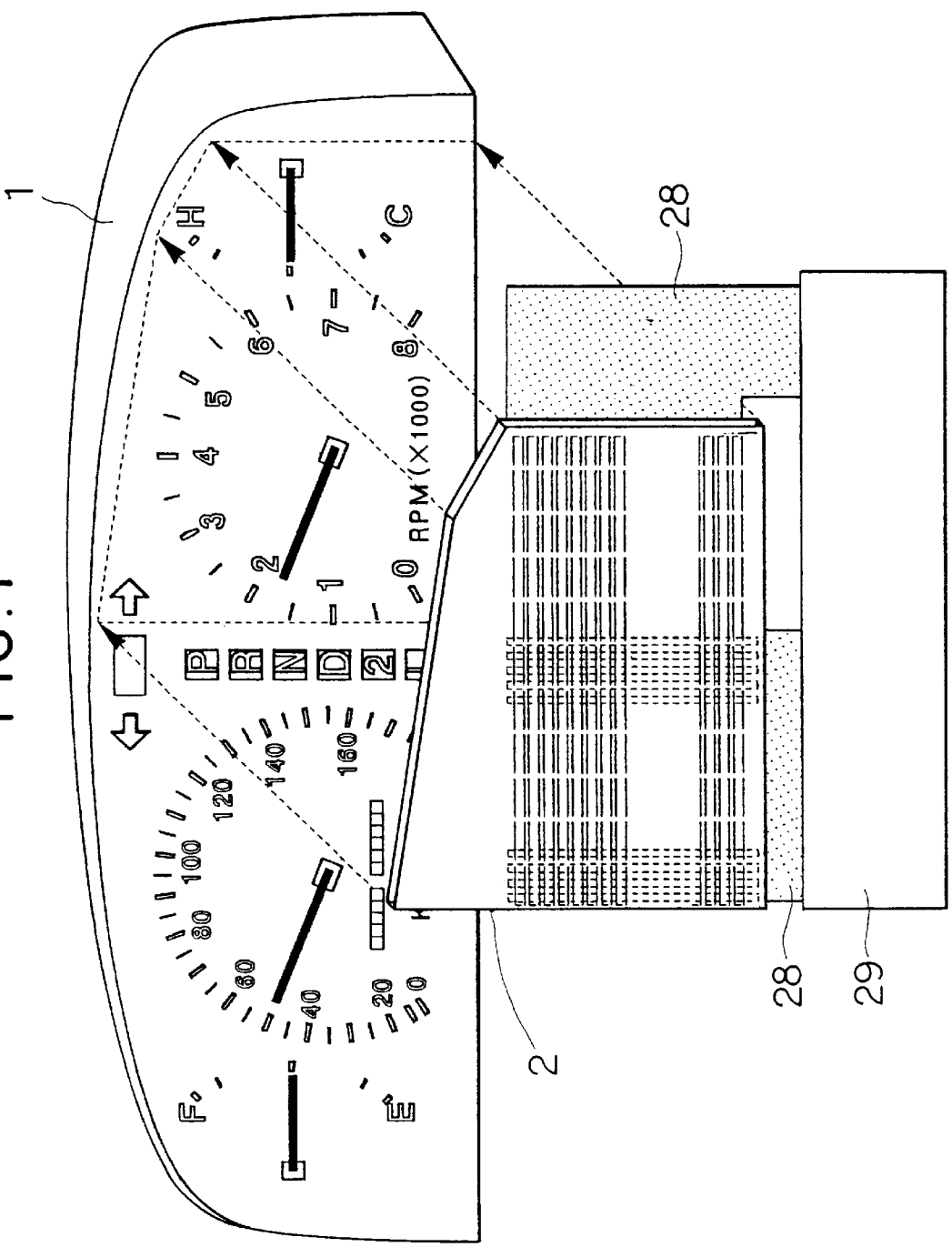
FIG. 1 is a schematic drawing showing a combined display panel including an instrument panel and a front panel to be overlapped on the instrument panel, which is a first embodiment according to the present invention.
Figure 4:
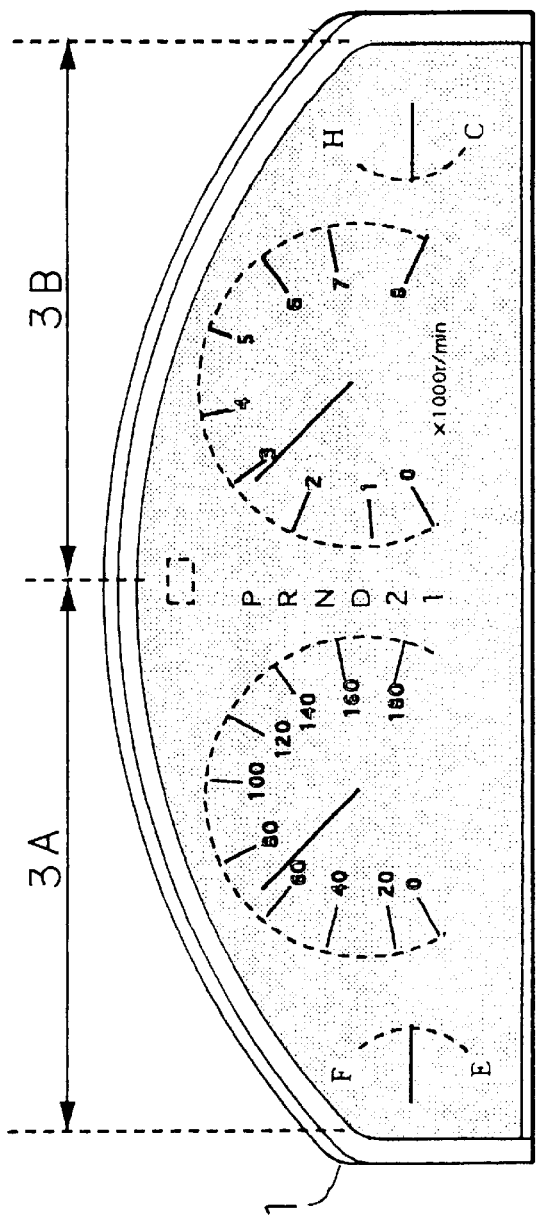
FIG. 4 is a front view of the combined display panel according to the present invention.

Referring to FIGS. 1 through 15, a first embodiment according to the present invention will be described. FIG. 1 schematically shows a total structure of the first embodiment. An instrument panel 1 is a conventional type instrument panel, a so called combination meter, which includes a speedometer, a tachometer (engine rotational speed indicator), a fuel gauge, a coolant temperature gauge, and an odometer, etc. On the right half section of the panel 1, a transparent electroluminescent display panel 2 for displaying additional information thereon is overlapped.

FIG. 2 is a cross-sectional view of FIG. 1 viewed from its top. Behind a display plate 3 there are installed illuminating lamps 51, 52, 53 and 54, each corresponding to the coolant temperature gauge, the tachometer, the speedometer and the fuel gauge, respectively. In front of the display plate 3 there are provided pointers of the respective meters and gauges, that is, a coolant temperature gauge pointer 41, a tachometer pointer 42, a speedometer pointer 43 and a fuel gauge pointer 44. The pointers are driven by respective drivers 61, 62, 63 and 64 which receive signals from respective sensors. The displays of the respective meters and gauges are turned on and off by switching the respective illuminating lamps on and off. The illuminating lamps 51 and 54 are incandescent lamps and the illuminating lamps 52 and 53 are ring-shaped fluorescent lamps. Light emitted from the respective illuminating lamps 51, 52, 53 and 54 is transmitted to the corresponding pointers 41, 42, 43 and 44 made of light transmissible resin through respective light transmitting paths 10. Also, the light emitted from the respective lamps is incident upon the display plate 3 and emitted through scales and numerals light-transmissibly printed on the display plate 3. The light incident upon the display plate 3 other than the scales and numerals is cut out thereon and does not come out from the display plate 3. Thus, the pointers and display plate are made luminous.

Figure 5:
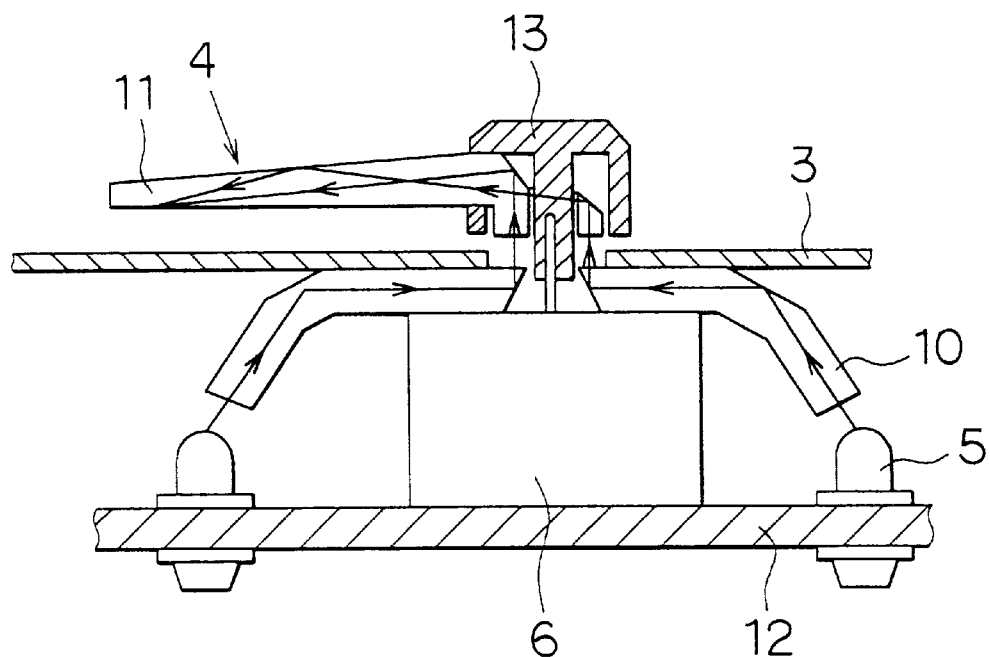
FIG. 5 is a cross-sectional view showing a way of light propagation to a pointer in the display device.
Figure 6:
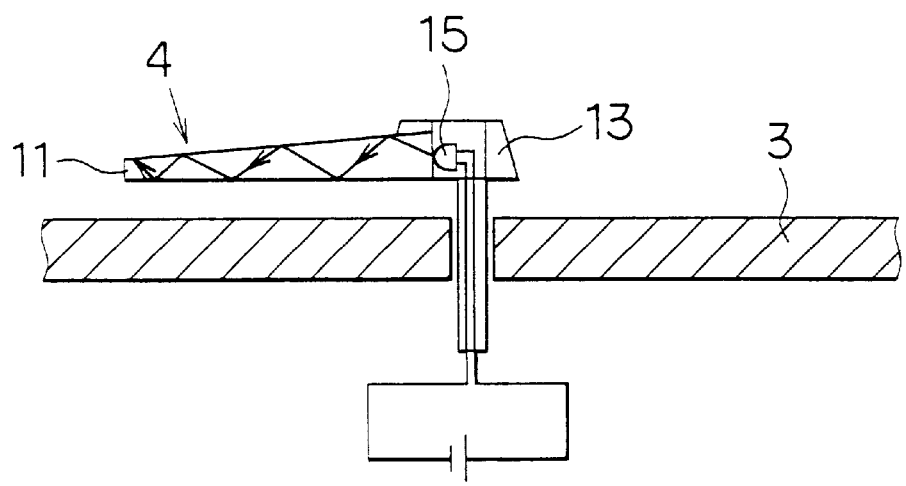
FIG. 6 is a cross-sectional view showing another way of light propagation to a pointer in the display device.
Figure 7:
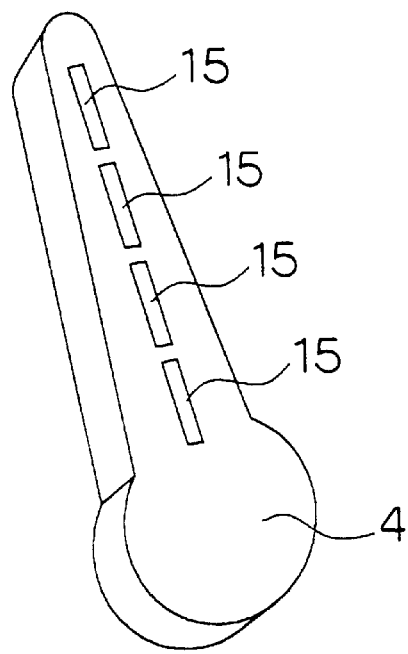
FIG. 7 is a perspective view showing a pointer having light emitting diodes thereon.
Figure 8:
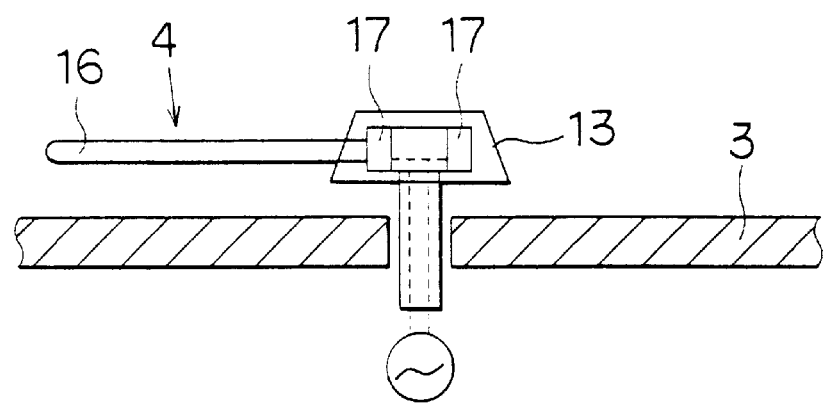
FIG. 8 is a fragmentary cross-sectional view showing a pointer and an illuminator in the display device.

The light transmission paths from lamps to a pointer are shown in FIG. 5. Light emitted from a lamp 5 is transmitted through a light path 10 to a pointer 4, making a whole pointer luminous. Incidentally, 12 is a back plate and 13 is a cover. The pointer may be illuminated in a manner shown in FIG. 6. A light emitting diode 15 is installed in the axis of the pointer and the light therefrom is led into the pointer 4 made of light transmissible resin. Also, a plurality of the light emitting diodes 15 may be disposed on the pointer itself as shown in FIG. 7. Further, the pointer may be constructed as shown in FIG. 8, in which the pointer is a fluorescent tube itself. In this case electrodes 17 for the fluorescent tube are installed in the center axis of the pointer.

FIG. 9 shows a transparent electroluminescent display panel 2 used in the first embodiment shown in FIG. 1. The panel 2 is composed of a front glass plate 21, a rear glass plate 27 and electroluminescent elements 22 through 26, the elements being hermetically held between the front and rear glass plates which are supported by a spacer 201 with a certain space 202 therebetween. In the space between two glass plates 21 and 27, silicone oil is filled. The electroluminescent elements include first transparent electrodes 22 made of ITO (indium-oxide, tin), ZnO (zinc-oxide) or the like; a first insulating layer 23 made of silicon-nitride-oxide, tantalum-oxide or the like; a luminescent layer 24 made of zinc-sulfide or the like as its base material; a second insulating layer 25 made of the same material as the first insulating layer; and a second transparent electrodes 26 made of the same material as first transparent electrodes 22. All of these layers 22 through 26 are formed on the front glass plate 21 in this order. The electroluminescent panel 2 to be used in the combined display device may be made of organic materials besides the inorganic materials described above.

Figure 3:
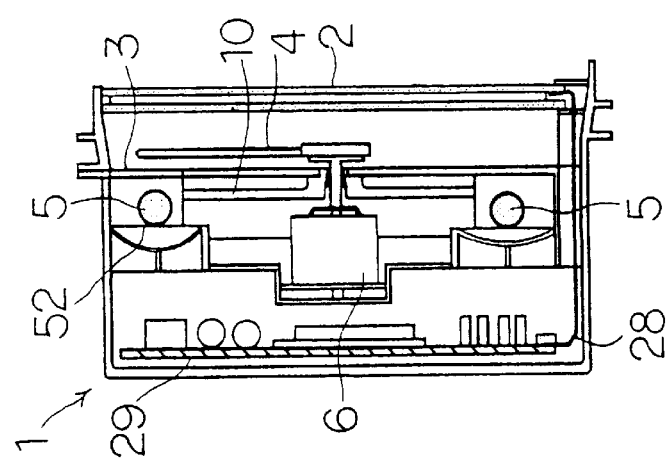
FIG. 3 is a cross-sectional view of the combined display panel viewed from the left side of FIG. 1.

The transparent electroluminescent panel 2 thus made is disposed to cover the front surface of the tachometer portion as shown in FIGS. 1 and 2. A circuit board 29 for driving and controlling the electroluminescent panel 2 is disposed at the back of meters and connected to the panel through flexible wiring 28. As shown in FIGS. 2 and 3, the flexible wiring 28 is connected to the first and second transparent electrodes 22 and 26 at the right and bottom sides of the panel 2 by soldering. The flexible wiring 28 is also connected to the circuit board 29 through connectors.

Exemplary displays to be shown on the combined display panel under various situations will be described referring to FIGS. 10A, 10B, 11A and 11B. FIG. 10A shows an exemplary display shown on the combined panel during a period from starting an engine to starting a vehicle, i.e., during an idling period. On the right portion of the panel where the electroluminescent (EL) panel 2 is overlapped on the tachometer area, there is shown a message "FASTEN SEAT BELT" on the EL panel while a usual speedometer is shown on the left portion. When this message is first shown it flashes several times and remains lighted thereafter. On turning on the EL display, the display of the tachometer which is behind the EL panel is turned off by switching off the illuminating lamp 52 corresponding to the tachometer. In other words, when the EL panel is turned on, the lamp 52 is automatically switched off, and vice versa by a circuitry shown in FIG. 12.

As shown in FIG. 10B, the EL display is turned off and usual instrument panel displays are shown on the panel under a situation when a vehicle is normally driven. Because the EL panel is transparent, all displays behind the EL panel can be clearly seen when the EL panel is turned off.

Figure 11A:
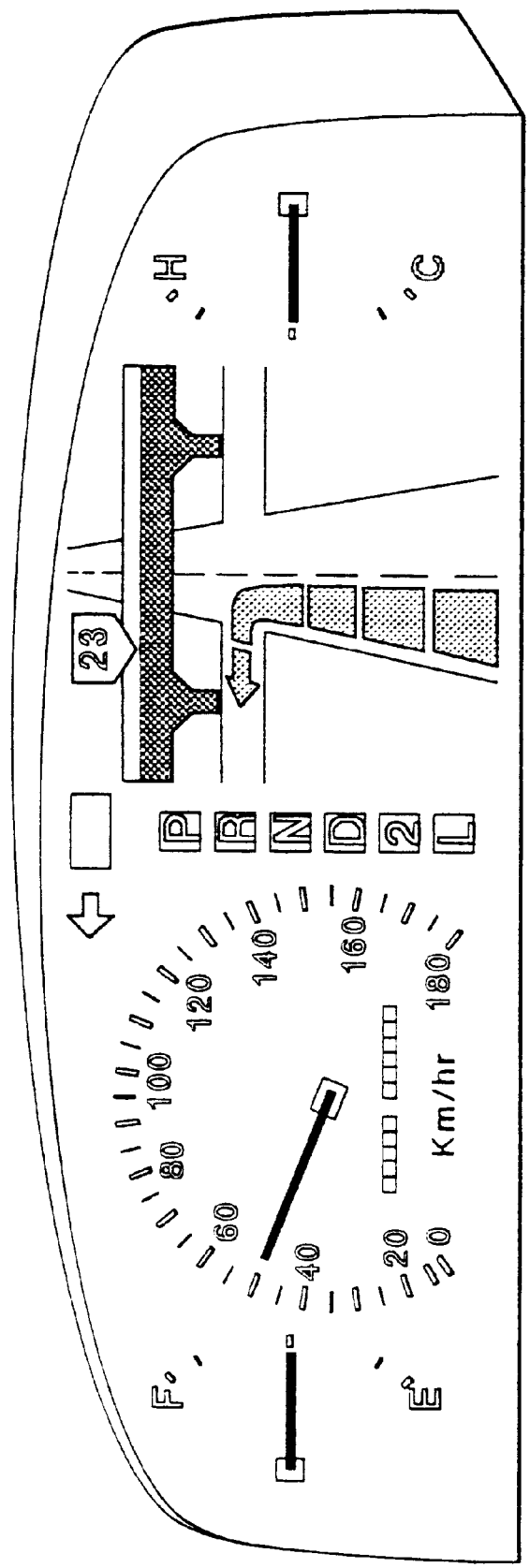
FIG. 11A is a front view of the combined display panel showing images shown on the panel when a navigation chart is displayed on the front panel while a vehicle is being driven.
Figure 11B:
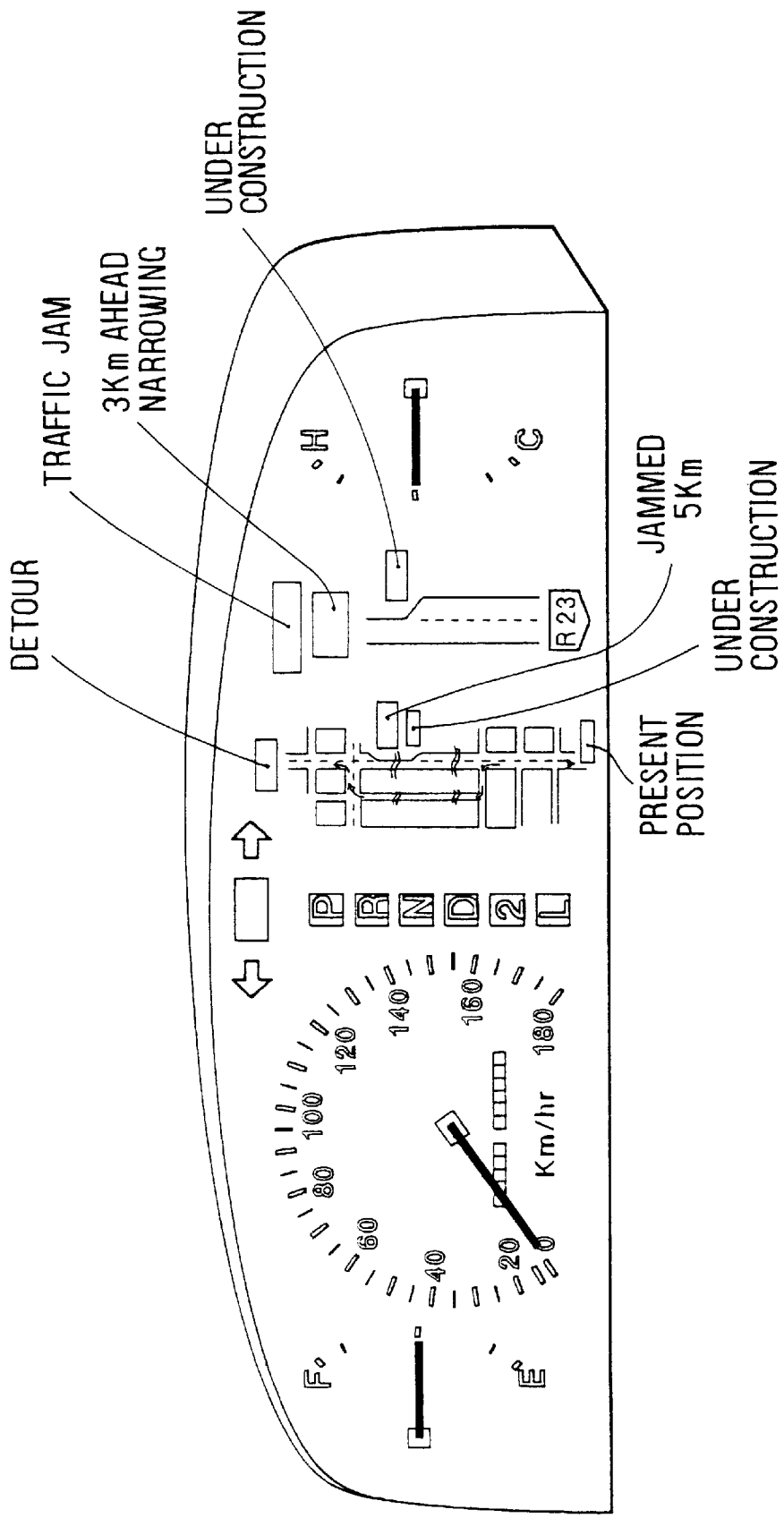
FIG. 11B is a front view of the combined display panel showing images shown on the panel when a detailed map for navigation is displayed on the front panel when a vehicle stops.
Figure 12:
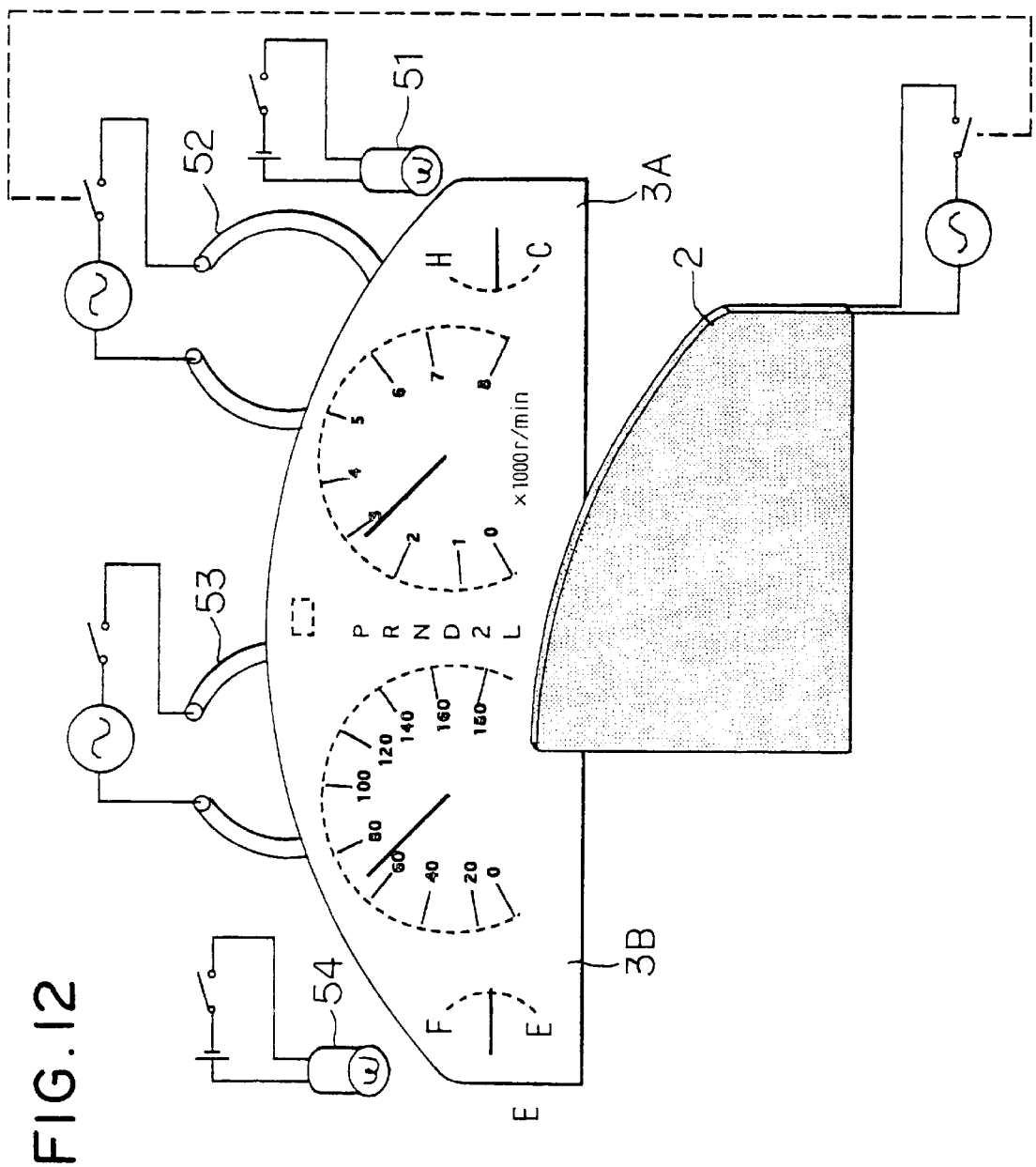
FIG. 12 is a drawing showing a combination of illuminating devices of the instrument panel and a transparent electroluminescent display panel in the first embodiment of the present invention.

FIG. 11A shows the panel displaying navigating information on the EL panel at the right portion, and a usual speedometer and a fuel gauge at the left side. This display is shown when a driver turns on a navigation system, or automatically if such a system is installed, during the vehicle is driven. In this case, considering the situation where the vehicle is being driven, the navigating information is not in detail but in brief. The tachometer display is turned off in this case too, as in the situation shown in FIG. 10A. On the other hand, when the vehicle stops at an intersection, for example, the navigating information on the EL panel at the right side is automatically switched to a detailed one as shown in FIG. 11B. This switching to the brief information to the detailed information is carried out automatically by such a system installed on the vehicle together with the navigation system.

Figure 13:
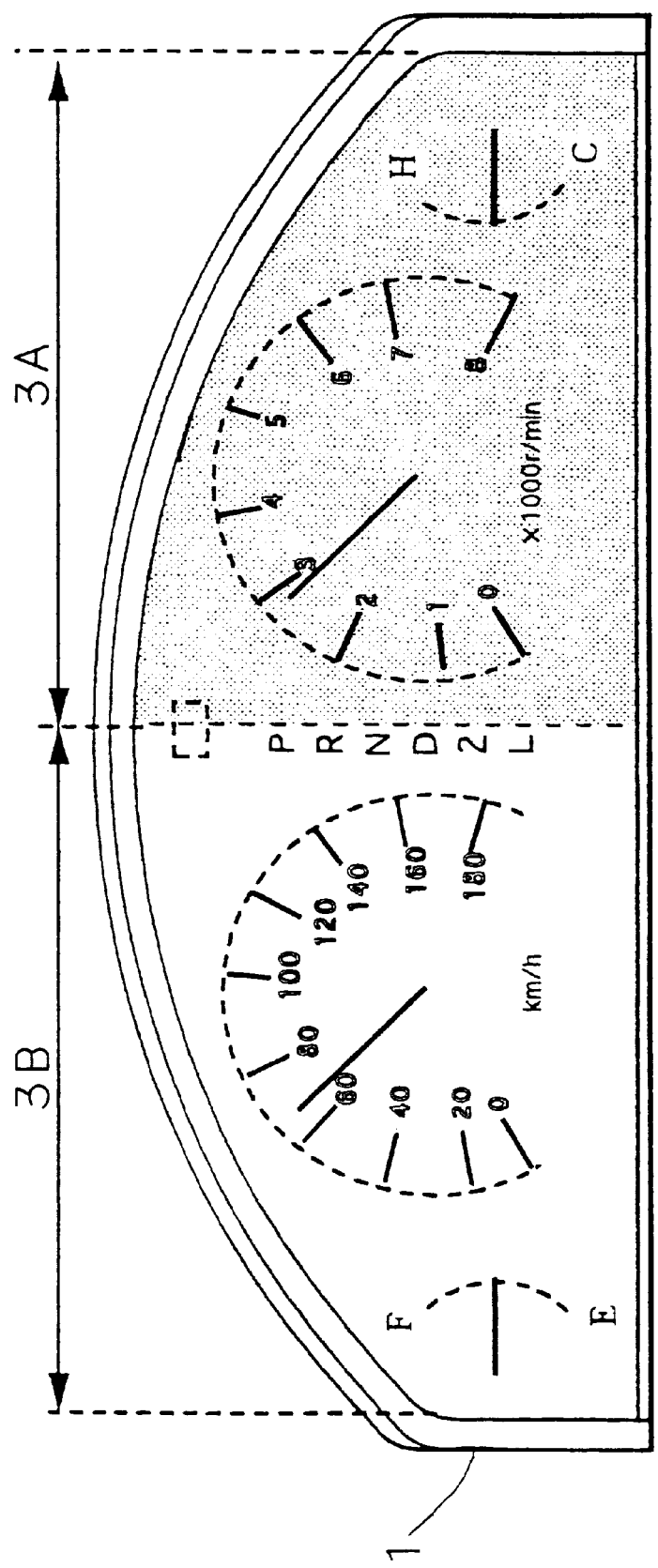
FIG. 13 is a front view of the combined display panel showing a luminance difference between two sections when no luminance adjustment is done.

Among four situations shown in FIGS. 10A, 10B, 11A and 11B, the situation of FIG. 10B, that is normal driving, occurs most frequently. Under the most frequent situation of FIG. 10B, there would exist a luminance or brightness imbalance between the left and right portions of the panel if no measures were taken to overcome it, because the right portion of the panel is covered by the EL panel which has a transparency of about 80%. FIG. 13 shows an image of the luminance imbalance between the left and right portions of the panel. The transparency of the EL panel or a transparent liquid crystal panel is affected mostly by a transparency of electrodes used therein made of ITO, ZnO or the like which is a semiconductor material and absorbs some of visible light.

To eliminate the luminance imbalance on the display panel, in the first embodiment according to the present invention luminance of the illuminating lamps for the right portion 3A of the panel is made higher than those for the left portion 3B, so that the luminance of the whole panel becomes uniform after the EL panel covers the right portion. That is, the illuminating lamps 51 and 52 corresponding to the right portion 3A where the EL panel overlaps the back panel are made brighter than the lamps 53 and 54 corresponding to the left portion 3B of the panel. Thus, a driver seeing the combined display panel recognizes no luminance difference between the left and right portions of the panel.

Figure 14A:
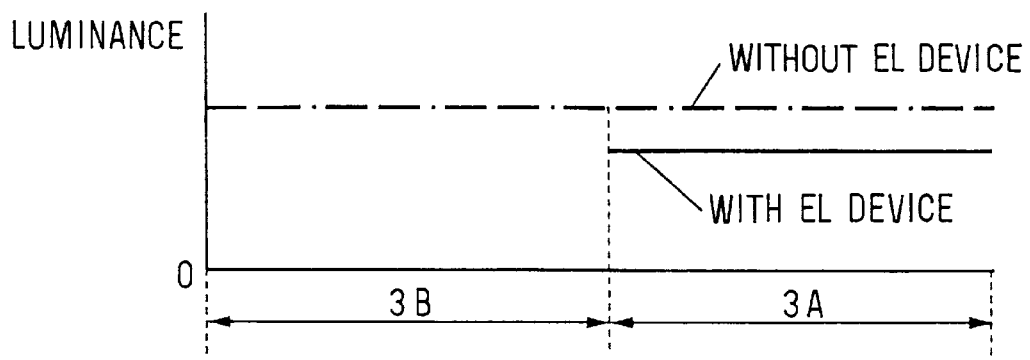
FIGS. 14A, 14B and 15 show luminance comparison between two sections on the combined display panel.
Figure 14B:
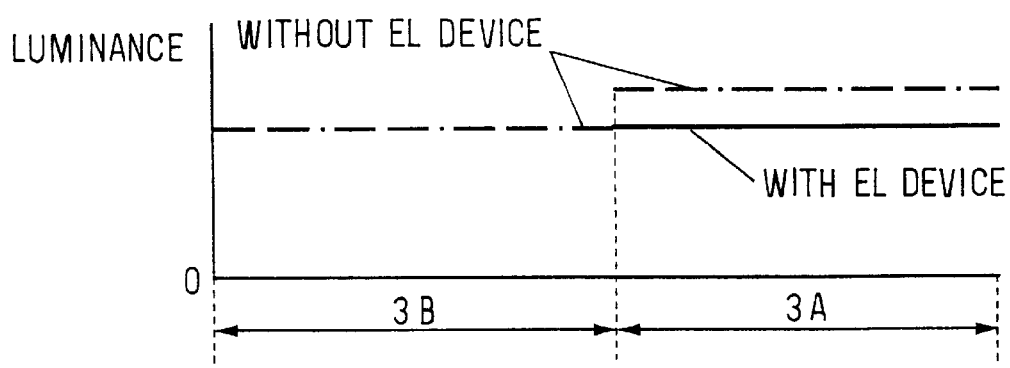

FIG. 14A shows a luminance imbalance between the left portion 3B of the combined display panel not covered by the EL panel and the right portion 3A covered by the EL panel, when the brightness of all the illuminating lamps is uniform. A dotted line indicates a uniform luminance on the display panel when there is no EL panel overlapped. When the right portion 3A is covered by the EL panel, luminance on the right portion 3A decreases to 80% of the left portion as indicated by a solid line. To avoid the luminance imbalance, the brightness of the illuminating lamps corresponding to the right portion 3A is made higher than that of the left portion as indicated by a dotted line in FIG. 14B in the first embodiment of the present invention. When the right portion 3A is covered by the EL panel, the luminance of the combined panel becomes uniform throughout all the surface thereof as indicated by a solid line in FIG. 14B.

Figure 15:
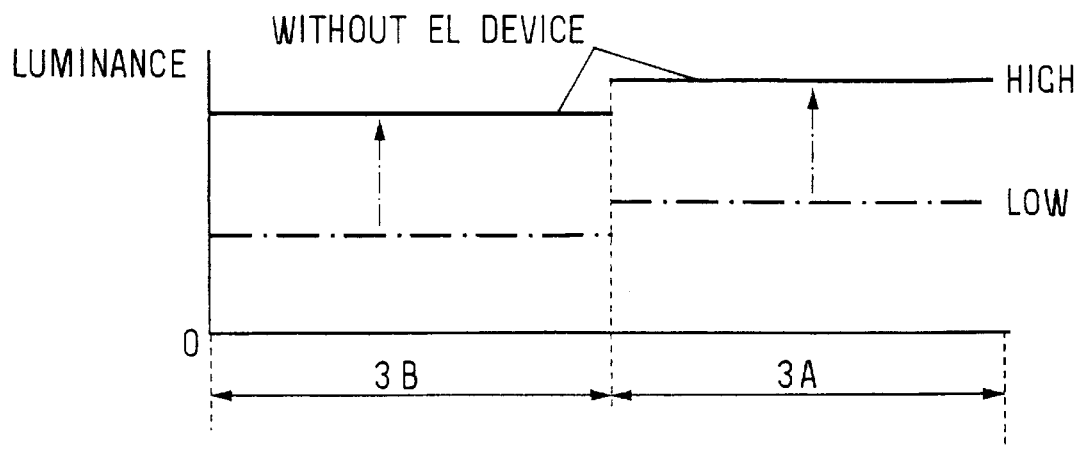

It is also possible to adjust the luminance on the combined panel while keeping the uniform luminance thereon by adjusting the brightness of illuminating lamps as shown in FIG. 15. The brightness of the illuminating lamps may be adjusted by a driver manually or by means of a switching device which automatically switches the brightness from LOW to HIGH or vice versa detecting an outside light intensity. A dotted line in FIG. 15 shows a LOW level and a solid line shows a HIGH level, both of which have a certain brightness difference between the right portion 3A and the left portion 3B so that the combined panel, when the right portion 3A is covered by the EL panel, has a uniform luminance on both portions.

Although fluorescent and incandescent lamps are used as illuminating lamps in the foregoing embodiment, other kinds of illuminating devices such as light emitting diodes may be used as far as they are energized electrically and their brightness is adjustable. The back glass plate 27 of the EL panel 2 may be made to cover a whole front surface of the instrument panel with the EL elements mounted only on the right portion, though the glass plates 21 and 27 of the foregoing embodiment cover only the right portion.

A second embodiment according to the present invention will be described referring to FIGS. 16, 17A, 17B and 18. In this embodiment a dimming filter 7 is used to eliminate the luminance imbalance on the combined display panel, instead of changing brightness of illuminating lamps as done in the first embodiment.

Figure 16:
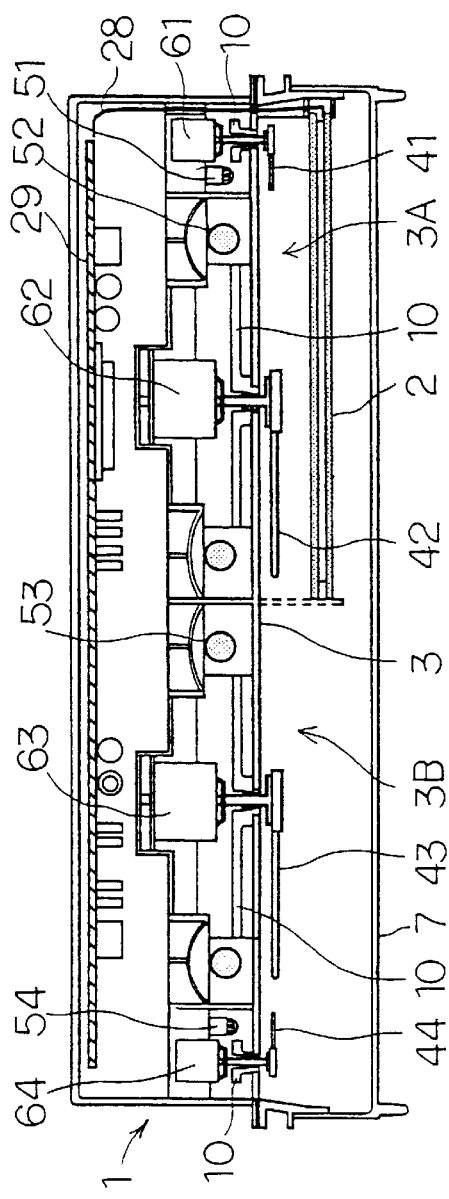
FIG. 16 is a cross-sectional view of a combined display panel showing a second embodiment according to the present invention.

FIG. 16 shows a cross-sectional view of the second embodiment, in which a dimming filter 7 made of acrylic resin is disposed to cover a whole surface of the combined display panel. Structures of the second embodiment other than the dimming filter 7 are the same as those of the first embodiment. As shown in FIG. 17A, the combined display panel has an luminance imbalance between the right portion 3A where the EL panel is overlapped and the left portion 3B where no additional panel is overlapped, when the back light brightness is uniform. To compensate the luminance difference, the dimming filter 7 as shown in FIG. 17B is placed on the front surf ace of the combined display panel. The dimming filter 7 has different transparencies on the right half and the left half. The transparency of the right half 7A is 50% and that of the left half 7B is 40%. Because the transparency of the EL panel is about 80% as mentioned before, an overall transparency of the combined display panel with the dimming filter becomes 40% on both portions 3A and 3B. Thus, the luminance imbalance is eliminated when the EL panel is turned off and only the back panel displays its usual displays during a normal driving condition. Also, when the EL is turned on while the right portion 3A of the back panel is turned off, and the left portion 3B of the back panel is turned on, the luminance of the combined display panel is balanced on both portions because of the dimmed filter 7. Moreover, the combined display panel looks more natural as a whole even the EL panel partially covers the back panel. It is also possible to make the dimming filter 7 darker, for example, with transparency of 25% on the right portion 7A and 20% on the left portion 7B. Then, a whole surface of the combined display panel looks very dark when it is turned off and displays come out from the darkness when it is turned on. This is a so called blackout instrument panel which may enhance an appearance of the instrument panel.

Figure 18:
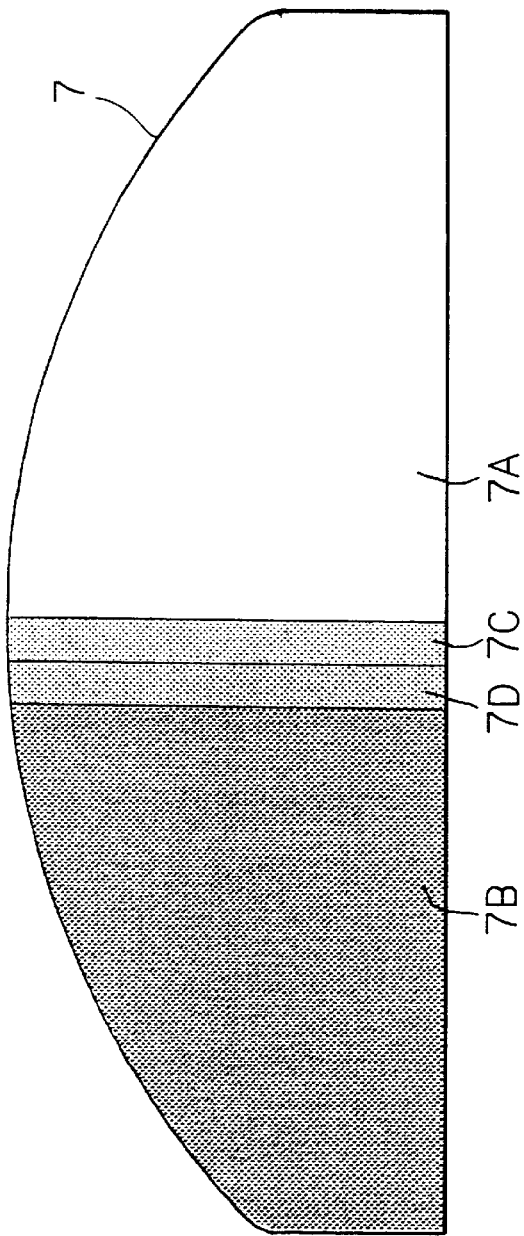
FIG. 18 shows another example of the dimming filter used on the panel of the second embodiment according to the present invention.

FIG. 18 shows a modification of the dimming filter 7 in which the transparency of the filter changes from portion 7B to 7A with intermediate portions 7D and 7C. In this case, the transparency of each portion may be made, for example, 40% on 7B, 43% on 7D, 46% on 7C and 50% on 7A. Alternatively, the transparency may be changed continuously on the portions 7D and 7C, so that the appearance of the combined display panel may be further enhanced.

Figure 19:
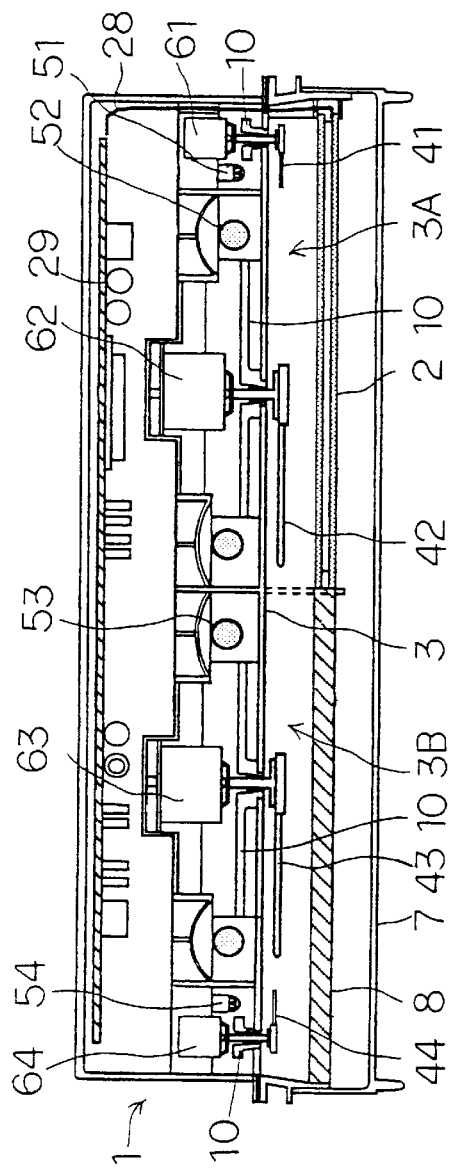
FIG. 19 is a cross-sectional view of a combined display panel showing a third embodiment according to the present invention.

FIG. 19 shows a third embodiment according to the present invention. In this embodiment, a transparency adjustment filter 8 having a substantially same transparency as the EL panel 2 (80% in this embodiment) is disposed to cover the portion 3B, and a dimming filter 7 having a uniform transparency for its entire surface is disposed to cover a whole front surface of the combined display panel. The transparency adjustment filter 8 is disposed at a equal surface level with the EL panel so that a surf ace level difference between the right portion 3A and the left portion 3B is invisible. The transparency adjustment filter 8 may be made of any material including glass as far as it has a substantially equal transparency to the EL panel. It is, however, preferable to use an inexpensive material such as acrylic resin. Since the transparencies of the adjustment filter 8 and the EL panel are substantially equal and the transparency of the dimming filter 7 is uniform, there is no luminance imbalance throughout a whole surface of the combined display panel. The dimming filter 7 in this embodiment serves to make a junction between the transparent adjustment filter 8 and the EL panel 2 invisible.

Figure 21:
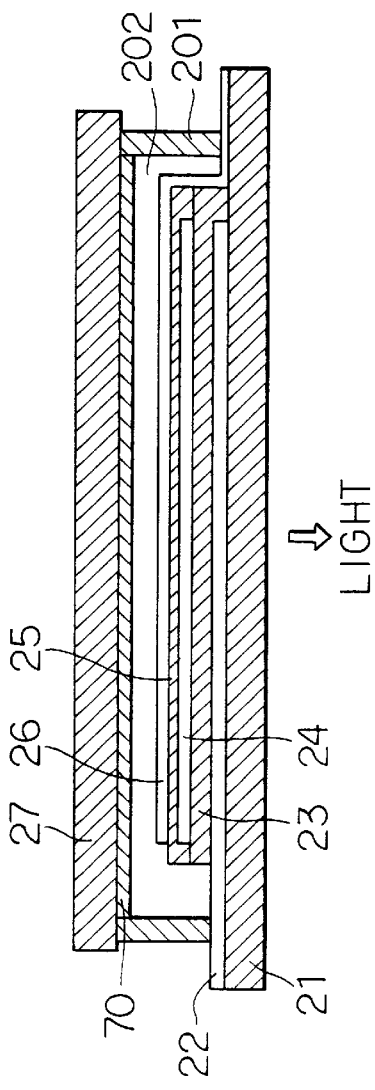
FIG. 21 is a cross-sectional view of an electroluminescent display panel used in the fourth embodiment.
Figure 20A:
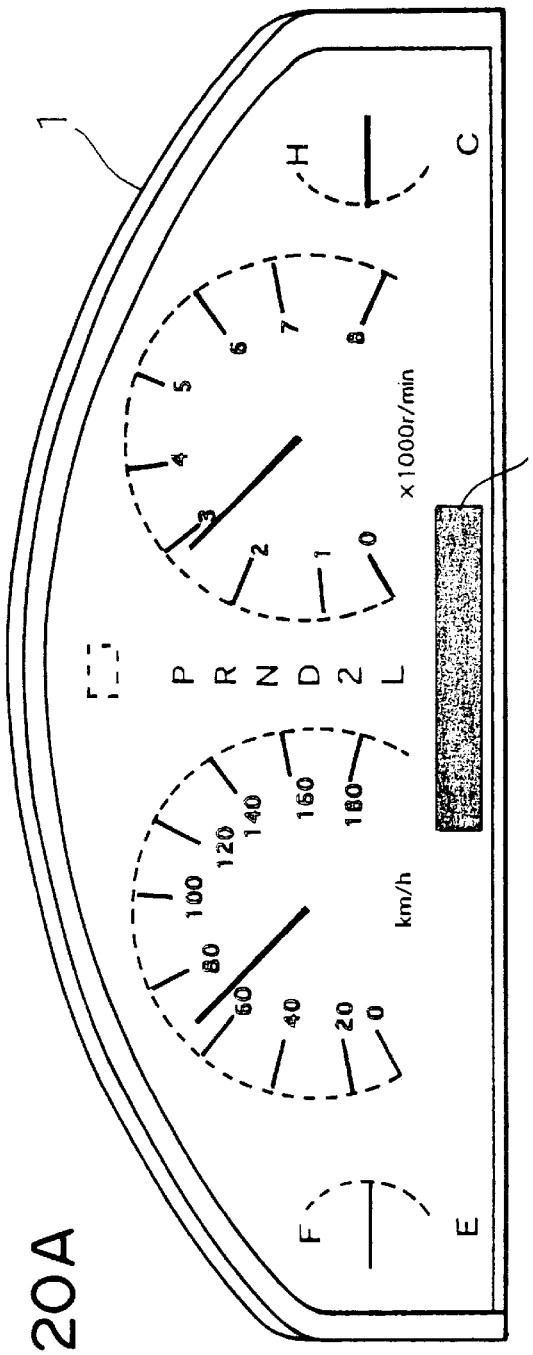
FIG. 20A is a front view of a combined display panel showing a fourth embodiment according to the present invention, a dimming filter being removed.
Figure 20B:
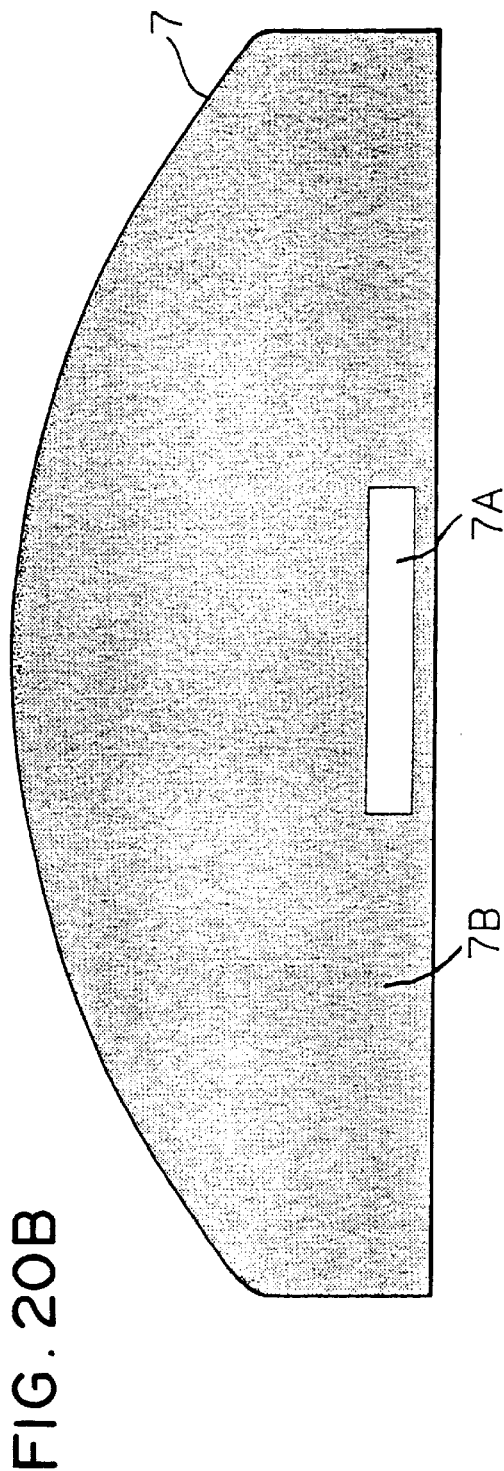
FIG. 20B shows a dimming filter used on the panel of of the fourth embodiment.

A fourth embodiment according to the present invention is shown in FIGS. 20A and 20B, and a non-transparent electroluminescent (EL) display panel 20 used in the fourth embodiment is shown in FIG. 21. In this embodiment, the non-transparent EL panel 20 for showing a message, for example, "FASTEN SEAT BELT" is disposed on the bottom portion of the instrument panel 1, and a dimming filter 7 with a portion 7A having a higher transparency than the other portion 7B is disposed to cover a whole front surface of the instrument panel 1. Because luminance of the EL panel is usually lower than that of other displays of the instrument panel, the portion 7A corresponding to the EL panel 20 is made to have higher transparency than the other portion 7B, so that overall luminance of the combined display panel becomes uniform after the dimming filter 7 is placed on the instrument panel 1.

The non-transparent EL display panel 20 used in the fourth embodiment is shown in FIG. 21. This panel is the same as the EL panel shown in FIG. 9 except for a black film 70 attached to the back glass plate 27. The black film 70 intercepts light emitted backwardly from the luminescent layer 24 and makes invisible the background of the EL panel when the EL panel is assembled onto the instrument panel 1.

A fifth embodiment according to the present invention will be described referring to FIGS. 22 and 23. In this embodiment, a combined display panel is constituted by combining an instrument panel 1 and a non-transparent electroluminescent panel 20. The combined display panel includes a fuel gauge 111, a warning display 112, a coolant temperature gauge 114, all of which are illuminated by light emitting diodes, a speedometer 113 using vacuum fluorescent tubes, and a non-transparent EL panel 20 which displays various information, for example, date, time, distance, selected radio channels and so forth. The fuel gauge 111, the warning display 112 and the EL panel 20 constitute a first display area, and the speedometer 113 and the coolant temperature gauge 114 constitute a second display area. The first display area and the second display area are placed on different surface levels as shown in FIG. 23, that is, the first display area is placed at a front level and the second display area is placed at a little inside from the front level. A transparency adjustment filter 8 is disposed to cover the second display area at the same surface level as the first display area. A dimming filter 7 having a uniform transparency throughout its whole surface is disposed to cover both of the first and second display areas.

The transparency adjustment filter 8 has such a transparency that there is no luminance difference between the first and second display areas when both are lit. The dimming filter 7 serves to make invisible a junction of the first and the second display areas in order to enhance an appearance of the combined display panel. The transparency adjustment filter 8 may be disposed to cover only the speedometer 113, and in this case it may be attached directly to the vacuum fluorescent tubes of the speedometer 113.

In the foregoing embodiments, the EL panel may be combined to not only mechanical analog meters but various kinks of instruments including digital meters using a liquid crystal display panel or vacuum fluorescent lamps. Also, transparent display panels such as liquid crystal panels may be used in place of the EL panel described above. Though the combined display panels to be used in an automobile vehicle are described above, they can be used, of course, in many other purposes.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A combined display panel comprising:
   a lightable instrument panel;
   a transparent display panel disposed in front of the instrument panel to overlap a part of the instrument panel, thereby forming an overlapped part and a non-overlapped part of the combined display panel; and means for balancing overall luminance of the combined display panel between the overlapped part and the non-overlapped part, when the instrument panel is lit and the transparent display panel is turned off.

2. A combined display panel of claim 1, wherein the balancing means comprises an illuminating device disposed behind the instrument panel and having a higher brightness at a portion corresponding to the overlapped part than at a portion corresponding to the non-overlapped part.

3. A combined display panel of claim 1, wherein the balancing means comprises a dimming filter covering a whole front surface of the combined display panel, the dimming filter having a higher transparency in an area corresponding to the overlapped part than in an area corresponding to the non-overlapped part.

4. A combined display panel of claim 1, wherein the balancing means comprises a transparency adjustment filter, disposed in front of the of the instrument panel covering the non-overlapped part, having a transparency substantially equalizing the overall luminance of the combined display panel between the overlapped part and the non-overlapped part.

5. A combined display panel of claim 2, wherein the brightness of the illuminating device is adjustable without changing a ratio of the brightness at the portion corresponding to the overlapped part to the brightness at the portion corresponding to the non-overlapped part.

6. A combined display panel of claim 4, wherein the transparency of the transparency adjustment filter is substantially equal to that of the transparent display panel.

7. A combined display panel of claim 4, wherein the transparency adjustment filter is disposed at the same surface level as the transparent display panel.

8. A combined display panel of claim 4, further including a dimming filter disposed in front of both of the overlapped and non-overlapped parts and having a uniform transparency throughout a whole surface thereof.

9. A combined display panel of claim 1, wherein the transparent display panel is an electroluminescent panel.

10. A combined display panel of claim 3, wherein the dimming filter includes at least one narrow area having an intermediate transparency disposed between the area having a higher transparency and the area having a lower transparency.

11. A combined display panel of claim 3, wherein the transparency of the dimming filter changes continuously in a narrow area between the area corresponding to the overlapped part and the area corresponding to the non-overlapped part.

12. A combined display panel comprising:

a lightable instrument panel;

a transparent display panel disposed in front of the instrument panel to overlap a part of the instrument panel, thereby forming an overlapped part and a non-overlapped part of the combined display panel; and a luminance balancer which balances the luminance of the overlapped part in relation to the non-overlapped part, when the instrument panel is lit and the transparent display panel is turned off.

* * * * *

UNITED STATES PATENT AND TRADEMARK OFFICE
CERTIFICATE OF CORRECTION

PATENT : 6,120,159
DATED : September 19, 2000
INVENTOR(S) : INOGUCHI et al.

It is certified that error appears in the above-identified patent and that said Letters Patent is hereby corrected as shown below:

ON THE TITLE PAGE

[75] Inventors: Nobuei ITO and Tadashi HATTORI should be deleted from the patent.

Signed and Sealed this

Fifteenth Day of May, 2001

*Attest:*

NICHOLAS P. GODICI

*Attesting Officer*     *Acting Director of the United States Patent and Trademark Office*